(12) United States Patent
Oguchi

(10) Patent No.: US 9,538,244 B2
(45) Date of Patent: Jan. 3, 2017

(54) EXTRACTION METHOD FOR EXTRACTING A PITCHING SCENE AND DEVICE FOR THE SAME

(71) Applicant: FUJITSU LIMITED, Kawasaki-shi, Kanagawa (JP)

(72) Inventor: Atsushi Oguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 77 days.

(21) Appl. No.: 14/578,576

(22) Filed: Dec. 22, 2014

(65) Prior Publication Data

US 2015/0208122 A1 Jul. 23, 2015

(30) Foreign Application Priority Data

Jan. 20, 2014 (JP) ................................ 2014-008170

(51) Int. Cl.
| H04N 21/47 | (2011.01) |
| H04N 21/472 | (2011.01) |
| H04N 21/234 | (2011.01) |
| H04N 21/845 | (2011.01) |

(52) U.S. Cl.
CPC .. H04N 21/47217 (2013.01); H04N 21/23418 (2013.01); H04N 21/47202 (2013.01); H04N 21/8456 (2013.01)

(58) Field of Classification Search
CPC ............ G06K 9/00711; G06K 9/00718; G06K 9/00724; G06K 9/00765; G06T 2207/30221; G06F 17/30796; H04N 5/147; H04N 21/23418; H04N 21/8456
See application file for complete search history.

(56) References Cited

U.S. PATENT DOCUMENTS

| 4,545,576 | A * | 10/1985 | Harris ............................. 273/25 |
| 2003/0182620 | A1* | 9/2003 | Errico et al. ................ 715/500.1 |
| 2007/0294716 | A1* | 12/2007 | Jeong et al. ..................... 725/19 |
| 2008/0044085 | A1* | 2/2008 | Yamamoto .................... 382/190 |
| 2008/0140232 | A1* | 6/2008 | Lee et al. ......................... 700/91 |
| 2008/0175486 | A1* | 7/2008 | Yamamoto .................... 382/206 |
| 2008/0269924 | A1 | 10/2008 | Huang et al. .................. 700/51 |

FOREIGN PATENT DOCUMENTS

| CN | 101299214 A | 11/2008 |
| JP | 2005-295296 A | 10/2005 |
| JP | 2007-124368 A | 5/2007 |
| JP | 2007-274400 A | 10/2007 |

(Continued)

OTHER PUBLICATIONS

Patent Abstracts of Japan, Publication No. 2005-295296, published Oct. 20, 2005.

(Continued)

*Primary Examiner* — Andrew W Johns
(74) *Attorney, Agent, or Firm* — Staas & Halsey LLP

(57) ABSTRACT

An extraction method includes detecting a frame corresponding to a pitchers' pitching scene included in captured footage of a baseball game that includes plural frames, based on a frame image characteristic, and extracting a frame in which a transition is made from other frames not detected as frames corresponding to the pitching scene to the detected pitching scene, as a frame representing a start of one of respective pitches by the pitcher.

10 Claims, 17 Drawing Sheets

(56) References Cited

FOREIGN PATENT DOCUMENTS

JP            2009-20621  A      1/2009

OTHER PUBLICATIONS

Espacenet English Abstract of Japanese Publication No. 2007-124368, Published May 17, 2007.
Espacenet English Abstract of Japanese Publication No. 2007-274400, Published Oct. 18, 2007.
Espacenet English Abstract of Japanese Publication No. 2009-20621, Published Jan. 29, 2009.
Korean Office Action dated Nov. 6, 2015 in corresponding Korean Patent Application No. 10-2014-0192027.
Espacenet English Abstract of Chinese Publication No. 101299214 A, Published Nov. 5, 2008.
Taiwanese Office Action dated Feb. 24, 2016 in corresponding Taiwanese Patent Application No. 103144779.
Korean Office Action dated Oct. 26, 2016 in corresponding Korean Patent Application 10-2014-0192027.

* cited by examiner

US 9,538,244 B2

EXTRACTION METHOD FOR EXTRACTING A PITCHING SCENE AND DEVICE FOR THE SAME

CROSS-REFERENCE TO RELATED APPLICATION

This application is based upon and claims the benefit of priority of the prior Japanese Patent Application No. 2014-008170, filed on Jan. 20, 2014, the entire content of which is incorporated herein by reference.

FIELD

The embodiments discussed herein are related to an extraction program, a storage medium stored with the extraction program, an extraction method, and a baseball footage metadata generation device.

BACKGROUND

Known services exist that distribute captured baseball game footage live, and distribute captured baseball game footage as video on demand (VoD) content. When distributed as VoD content, for example, the viewer selects a desired inning, which is then presented to the viewer in a viewable form. In order to present such VoD content, footage is manually extracted for each inning.

Technology has been proposed that extracts highlight scenes from captured baseball game footage.

RELATED PATENT DOCUMENTS

Japanese Laid-Open Patent Publication No. 2005-295296

SUMMARY

According to an aspect of the embodiments, a non-transitory recording medium stores a program that causes a computer to execute an extraction process. The process includes: detecting a frame corresponding to a pitchers' pitching scene included in captured footage of a baseball game that includes plural frames, based on a frame image characteristic; and extracting a frame in which a transition is made from other frames not detected as frames corresponding to the pitching scene to the detected pitching scene, as a frame representing a start of one of respective pitches by the pitcher.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

An example of an exemplary embodiment according to the technology disclosed herein is explained in detail below with reference to the drawings. In the present exemplary embodiment, explanation is given regarding an example of a baseball footage metadata generation device applied to a footage distribution system.

First Exemplary Embodiment

Figure 1:
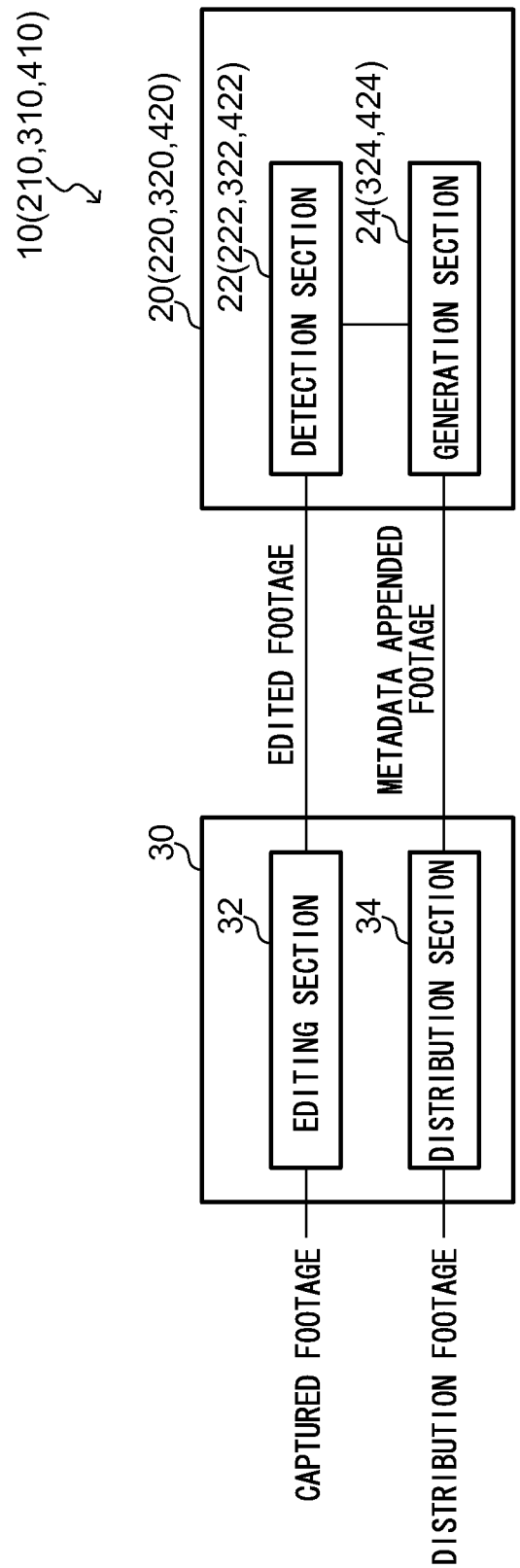
FIG. 1 is a functional block diagram illustrating a schematic configuration of a footage distribution system according to a first to a fourth exemplary embodiment.

As illustrated in FIG. 1, a footage distribution system 10 according to a first exemplary embodiment includes a baseball footage metadata generation device 20, and a distribution device 30. The baseball footage metadata generation device 20 and the distribution device 30 are connected through a network. In the footage distribution system 10, footage to which metadata generated by the baseball footage metadata generation device 20 has been added, is distributed through the network to a specified terminal by the distribution device 30. The baseball footage metadata generation device 20 includes a detection section 22, and a generation section 24. The distribution device 30 includes an editing section 32, and a distribution section 34.

First, detailed explanation is given regarding individual sections of the distribution device 30.

The editing section 32 acquires footage capturing a baseball game (referred to as "captured footage" hereafter). The captured footage is footage captured at a frame rate such as 30 fps, or 60 fps for example, and includes plural frames. Each frame is associated to time data indicating an elapsed time since the start of capture of the captured footage.

Figure 2:
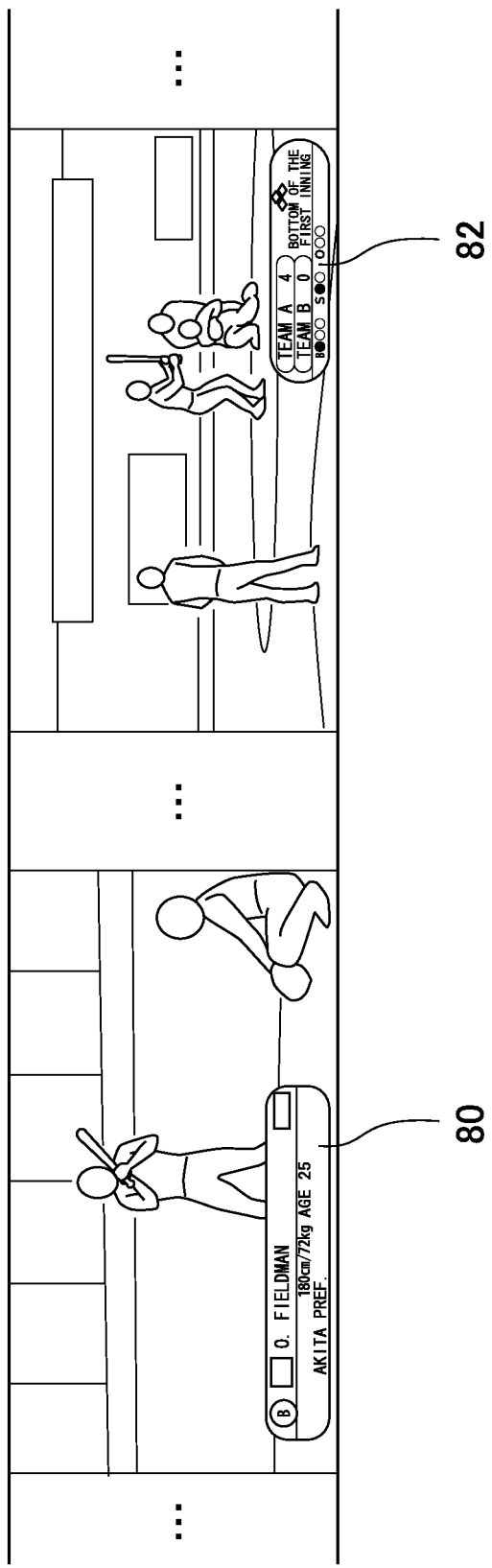
FIG. 2 is a diagram explaining an example of editing.

The editing section 32 applies editing commands, designated by operation of an operator using a display device and input device, not illustrated in the drawings, to the captured footage using image processing. As illustrated in FIG. 2, for example, the editing commands include adding an overlay 80 showing player data, and an overlay 82 showing the game status, for each frame corresponding to specified scenes in the captured footage. Footage in which editing has been performed on the captured footage by the editing section 32 is referred to as "edited footage" below. The editing section 32 transmits edited footage to the baseball footage metadata generation device 20.

The distribution section 34 acquires footage to which metadata generated by the baseball footage metadata generation device 20 has been added (referred to as "metadata appended footage" below; detailed explanation is given below). The metadata appended footage is converted to distribution footage according to specified standards, and distributed to a distribution destination terminal (not illustrated in the drawings) by the distribution section 34.

Next, detailed explanation follows regarding individual sections of the baseball footage metadata generation device 20.

Figure 3:
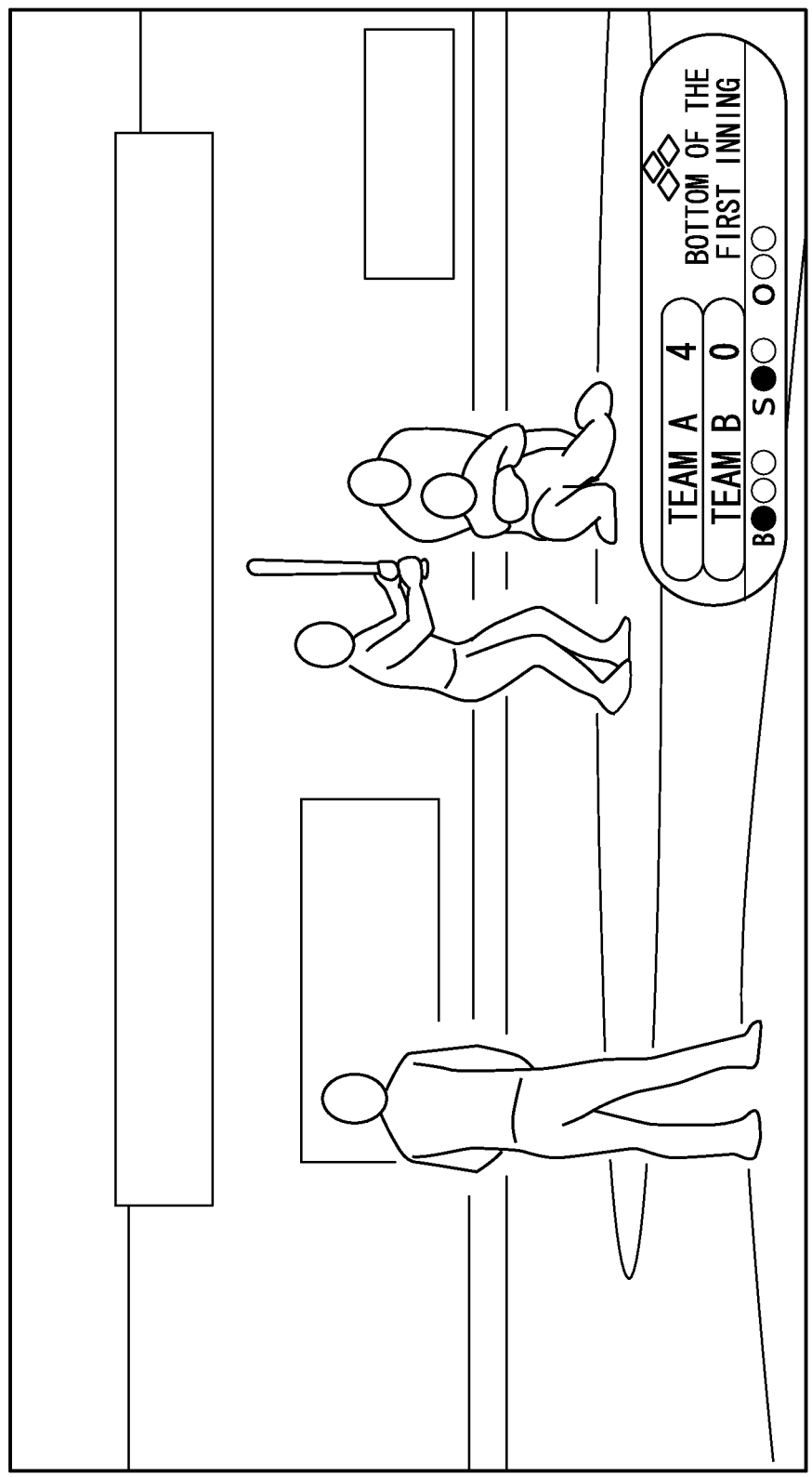
FIG. 3 is a diagram explaining a specific cut.

The detection section 22 acquires edited footage transmitted by the distribution device 30. The detection section 22 extracts from respective plural frames included in the edited footage, frames representing a cut captured at a camera angle used in a pitcher's pitching scenes (referred to as the "specific cut" hereafter). Note that a cut is a continuous segment captured at the same camera angle. In the present exemplary embodiment explanation follows regarding a case in which the specific cut is a cut captured in a batter-direction from behind the pitcher, as illustrated in FIG. 3.

Specifically, the detection section 22 extracts image characteristics for each frame. The image characteristics are characteristics represented by pixel data such as the luminance and color of each pixel inside the frame. The detection section 22 derives a similarity value between the reference image characteristics extracted from a pre-prepared frame representing the specific cut, and extracted image characteristics extracted from each frame of the edited footage. The detection section 22 extracts as frames representing the specific cut any frames with extracted image characteristics having a similarity value to the reference image characteristics of a specified value or greater.

The detection section 22 may employ characteristics representing image configuration (composition), characteristics representing, for example, color and luminance placement and distribution, characteristics obtained by a wavelet transform, and the like as the image characteristics. When such image characteristics are extracted, these characteristics may be extracted from the whole of each frame, or may be characteristics extracted from a portion of each frame (for example, a ballpark fence, or wall region included in the captured footage). In actual captured footage, even for the same specific cut, considerable discrepancies can arise in the configuration of the image, such as slight variations in camera angle, differences in where players stand, changes to background signboards, and the like. When image characteristics are extracted from the whole of frames, image characteristics may be extracted that suppress the effects of such considerable discrepancies arising in the configuration of the image. For example, when image characteristics are extracted from a portion of a frame, image characteristics are extracted from a region that excludes a region such as a region representing a background signboard, in which considerable variation arises in the configuration of the image. Employing image characteristics extracted in this manner enables an increase in precision of similarity determination.

Plural types of reference image characteristics may be prepared in consideration of differences in the background of each ballpark, different colors of uniforms worn by players, variation in overlay formats of each broadcaster, and the like. In such cases, the detection section 22 may acquire data such as the ballpark, the teams, and the broadcaster, together with the edited footage, and may select and use the reference image characteristics in accordance with the acquired data. Regarding variation in camera angle, it is conceivable that variations in camera angle and image characteristics may arise depending on the dominant hand of the pitcher or batter. Accordingly, reference image characteristics may be prepared for different pitcher and batter dominant hands (for example, four patterns such as pitcher: left-handed throw and batter: left-handed bat, pitcher: left-handed throw and batter: right-handed bat, pitcher: right-handed throw and batter: left-handed bat, and pitcher: right-handed throw and batter: right-handed bat). Then, the frames representing the specific cut may be extracted when one of the prepared reference image characteristics is matched.

The detection section 22 may extract, as image characteristics, characteristics indicating movement that characteristically indicates players in footage of the specific cut, such as the pitching form of the pitcher. For example, a movement vector at a characteristic point may be extracted as an image characteristic. In such cases, even when the ballpark, the teams, the overlay design, and the like vary, image characteristics are extractable for which the effects of such variation are suppressed.

Figure 4:
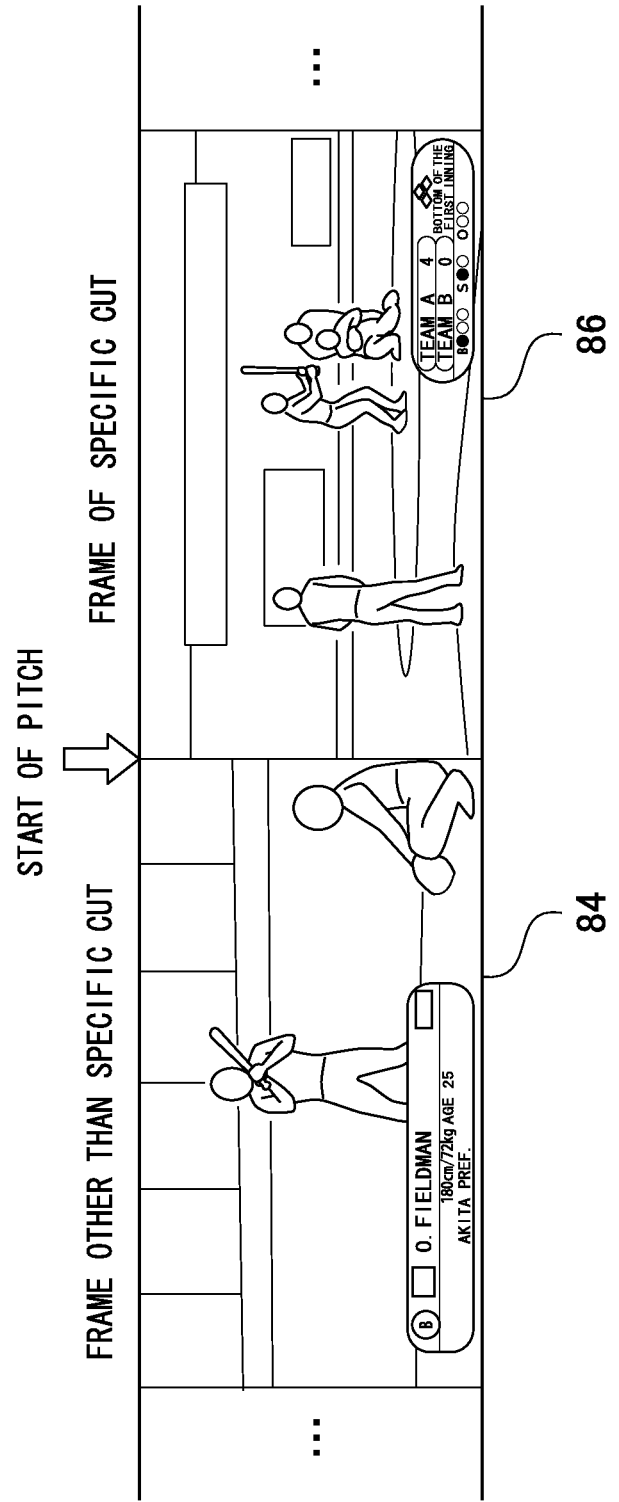
FIG. 4 is a diagram explaining a frame representing the start of a pitch.

Based on frames representing the extracted specific cut, the detection section 22 detects as frames representing the start of a pitch, frames in which transition was made from a frame other than frames representing specific cuts, to a frame representing a specific cut. For example, as illustrated in FIG. 4, a frame 84 is considered a frame other than the frames representing specific cuts, and a frame 86 that follows the frame 84 is considered a frame that represents a specific cut. In this case, the detection section 22 detects the frame 86 as a frame representing the start of a pitch.

Figure 5:
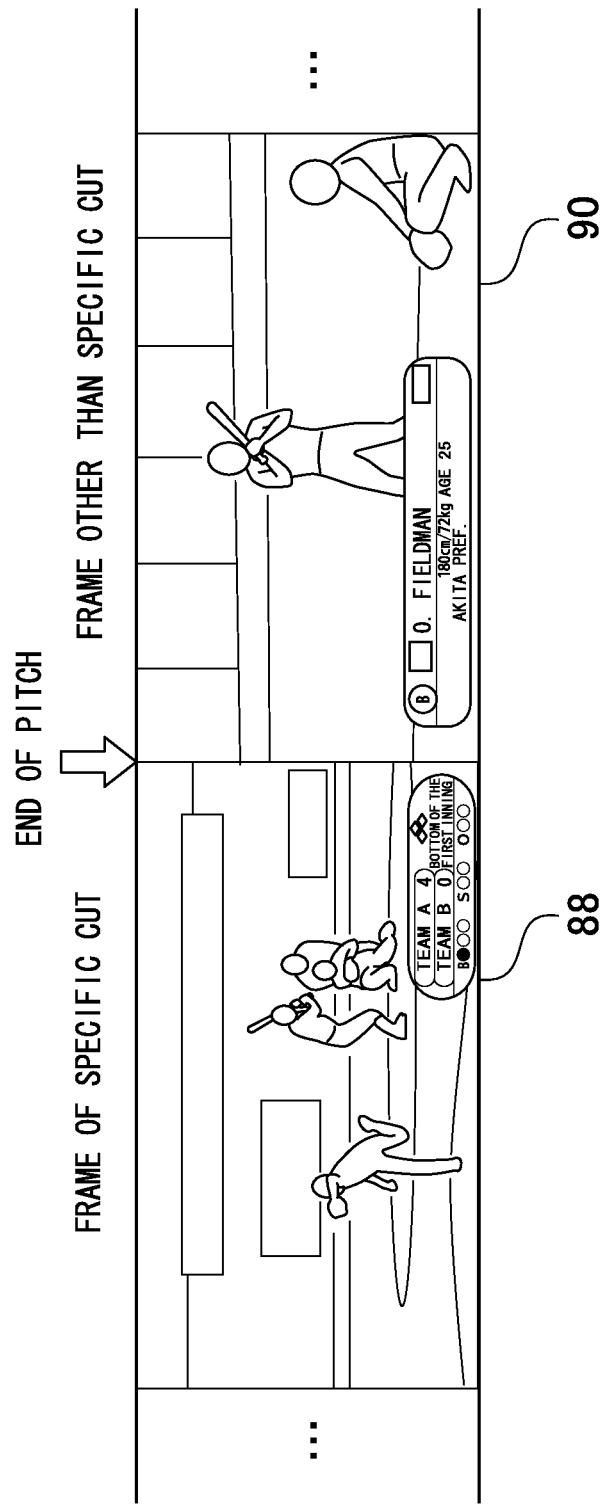
FIG. 5 is a diagram explaining a frame representing the end of a pitch.

The detection section 22 detects as frames representing the end of a pitch, frames in which transition was made from a frame representing a specific cut, to a frame other than the frames representing specific cuts. For example, as illustrated in FIG. 5, a frame 88 is considered a frame representing a specific cut, and a frame 90 that follows the frame 88 is considered a frame other than the frames representing specific cuts. In this case, the detection section 22 detects the frame 88 as a frame representing the end of a pitch.

The generation section 24 generates metadata indicating the start of each pitch by a pitcher, and metadata indicating the end of each pitch, based on the frames detected by the detection section 22. Specifically, the generation section 24 generates metadata that associates data representing the starts of the pitches to time data associated to the frames representing the start of a pitch as detected by the detection section 22. Similarly, the generation section 24 generates metadata that associates data representing the ends of the pitches to time data associated to the frames representing the end of a pitch as detected by the detection section 22. Note that the generation section 24 may associate the metadata to frames.

Figure 6:
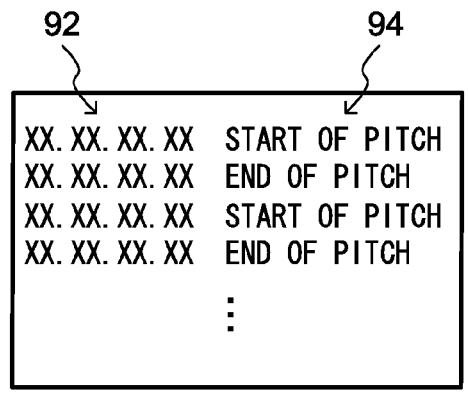
FIG. 6 is a diagram illustrating an example of a metadata file.

The generation section 24 generates a metadata file that stores the plural generated metadata in the sequence of the time data included in the metadata. The metadata file may be generated as a file formatted as, for example, a csv (comma-separated values) file. An example of a metadata file is illustrated in FIG. 6. In the example of FIG. 6, each row represents a single item of metadata, and each item of metadata includes time data 92, and data (reference numeral 94) representing the start or end of a pitch.

Although explanation is given here regarding a case in which metadata is generated using time data associated to frames, metadata may be generated using other data for identifying respective frames, such as frame numbers.

The edited footage is appended with the generated metadata file, and transmitted by the generation section 24 to the distribution device 30 as the metadata appended footage.

Figure 7:
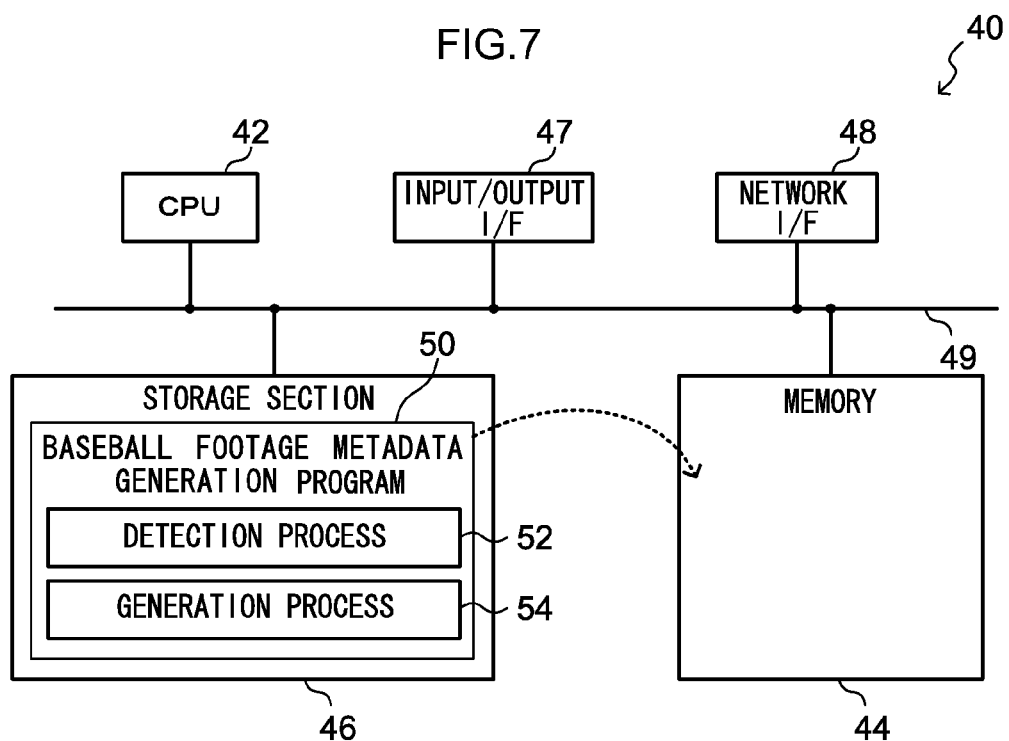
FIG. 7 is a schematic block diagram illustrating an example of a computer that functions as a baseball footage metadata generation device.

The baseball footage metadata generation device 20 may be implemented by, for example, a computer 40 illustrated in FIG. 7. The computer 40 includes a CPU 42, memory 44, a non-volatile storage section 46, an input/output interface (I/F) 47, and a network I/F 48. The CPU 42, the memory 44, the storage section 46, the input/output I/F 47, and the network I/F 48 are mutually connected through a bus 49.

The storage section 46 may be implemented by a hard disk drive (HDD), flash memory, or the like. The storage section 46, serving as a storage medium, is stored with a baseball footage metadata generation program 50 that causes the computer 40 to function as the baseball footage metadata generation device 20. The baseball footage metadata generation program 50 is read from the storage section 46, and expanded into the memory 44, and a process including the baseball footage metadata generation program 50 sequentially executed by the CPU 42.

The baseball footage metadata generation program 50 includes a detection process 52, and a generation process 54. The CPU 42 operates as the detection section 22 illustrated in FIG. 1 by executing the detection process 52. Moreover, the CPU 42 operates as the generation section 24 illustrated in FIG. 1 by executing the generation process 54. Thus, having executed the baseball footage metadata generation program 50, the computer 40 functions as the baseball footage metadata generation device 20.

Figure 8:
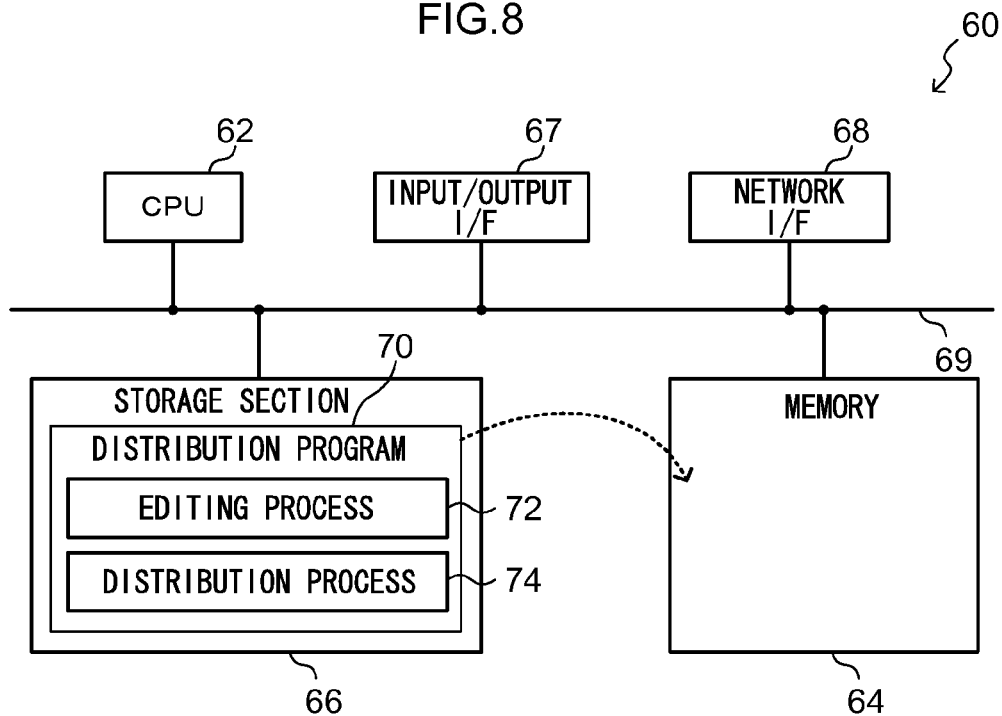
FIG. 8 is a schematic block diagram illustrating an example of a computer that functions as a distribution device.

The distribution device 30 may be implemented by, for example, a computer 60 illustrated in FIG. 8. The computer 60 includes a CPU 62, memory 64, a non-volatile storage section 66, an input/output I/F 67, and a network I/F 68. The CPU 62, the memory 64, the storage section 66, the input/output I/F 67, and the network I/F 68 are mutually connected through a bus 69. Moreover, a display device and an input device, not illustrated in the drawings, are connected to the computer 60 through the input/output I/F 67.

The distribution device 30 and the baseball footage metadata generation device 20 are connected through the network I/F 68 of the distribution device 30, the network, and the network interface 48 of the baseball footage metadata generation device 20.

The storage section 66 may be implemented by a HDD, flash memory, or the like. The storage section 66, serving as a storage medium, is stored with a distribution program 70 that causes the computer 60 to function as the distribution device 30. The distribution program 70 is read from the storage section 66 and expanded into the memory 64, and a process including the distribution program 70 is sequentially executed by the CPU 62.

The distribution program 70 includes an editing process 72, and a distribution process 74. The CPU 62 operates as the editing section 32 illustrated in FIG. 1 by executing the editing process 72. Moreover, the CPU 62 operates as the distribution section 34 illustrated in FIG. 1 by executing the distribution process 74. Thus the computer 60 executing the distribution program 70 functions as the distribution device 30.

Note that the baseball footage metadata generation device 20, and the distribution device 30 can respectively be implemented by, for example, a semiconductor integrated circuit, more specifically, by an application specific integrated circuit (ASIC), or the like.

Next, explanation is given regarding operation of the footage distribution system 10 according to the first exemplary embodiment. When the captured footage is input to the distribution device 30, the distribution device 30 executes editing processing illustrated in FIG. 9, and outputs the edited footage. Next, when the edited footage is input to the baseball footage metadata generation device 20, the baseball footage metadata generation device 20 executes baseball footage metadata generation processing illustrated in FIG. 10, and outputs the metadata appended footage. Then, when the metadata appended footage is input to the distribution device 30, the distribution device 30 executes distribution processing illustrated in FIG. 11, and outputs the distribution footage. Each processing is described in detail below.

Figure 9:
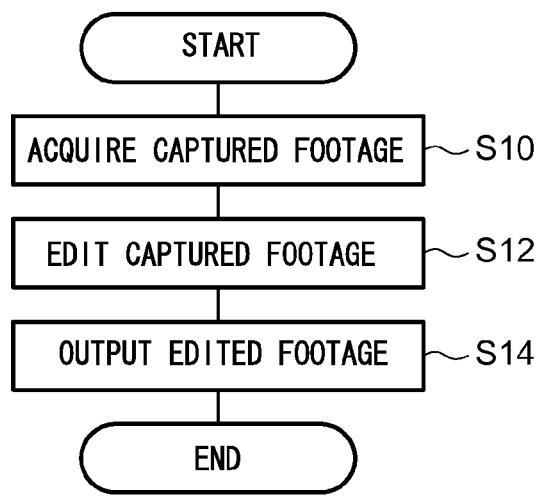
FIG. 9 is a flowchart illustrating an example of editing processing.

First, at step S10 of the editing processing illustrated in FIG. 9, the editing section 32 acquires the captured footage. Next, at step S12, the editing section 32 applies editing commands, designated by the operation of an operator using a display device and input device, not illustrated in the drawings, to the captured footage using image processing. Next, at step S14, the editing section 32 transmits the edited footage to the baseball footage metadata generation device 20, and the editing processing ends.

Figure 10:
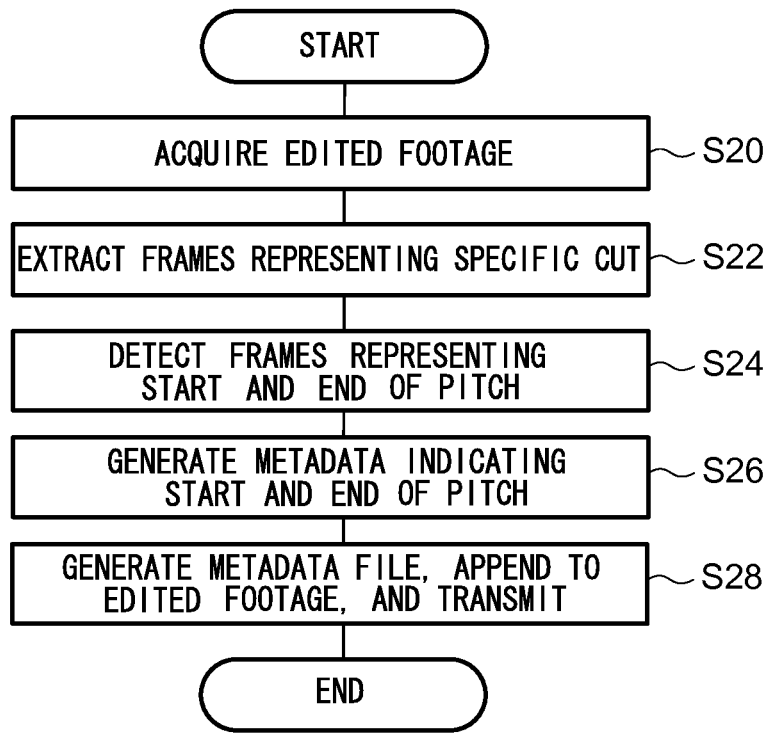
FIG. 10 is a flowchart illustrating baseball footage metadata generation processing according to the first exemplary embodiment.

Next, at step S20 of the baseball footage metadata generation processing illustrated in FIG. 10, the detection section 22 acquires the edited footage transmitted from the distribution device 30.

Next, at step S22, the detection section 22 extracts frames representing the specific cut from each of plural frames included in the edited footage. Specifically, the detection section 22 extracts extracted image characteristics from each of the plural frames included in the edited footage. Then, the detection section 22 derives the similarity value between the pre-prepared reference image characteristics and the extracted image characteristics, and frames with extracted image characteristics having a similarity value to the reference image characteristics of the specified value or greater are extracted as frames representing the specific cut.

Next, at step S24, based on the frames representing the extracted specific cut, the detection section 22 detects as a frame representing the start of a pitch, frames in which transition was made from a frame other than frames representing the specific cut, to a frame representing a specific cut. Similarly, the detection section 22 detects as a frame representing the end of a pitch, frames in which transition was made from a frame representing a specific cut, to a frame other than frames representing the specific cut.

Figure 12:
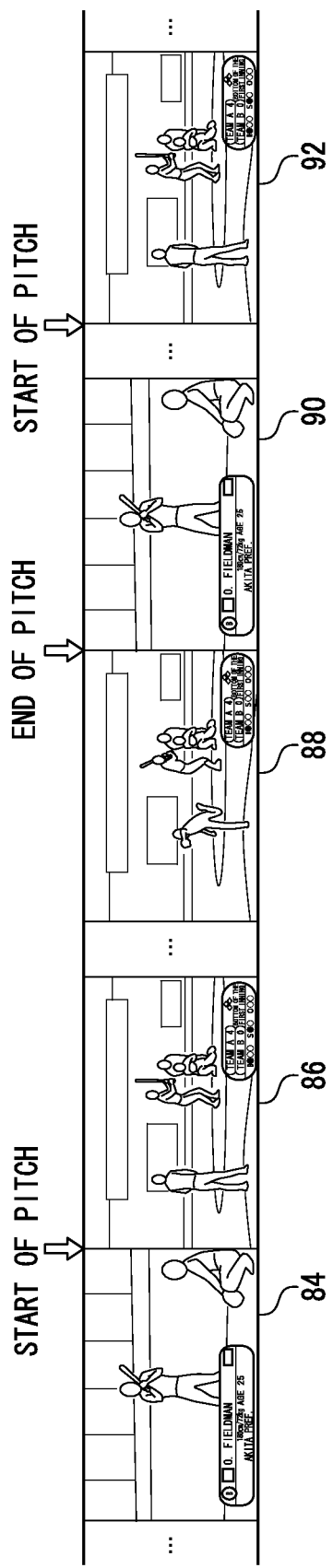
FIG. 12 is a diagram explaining frames representing the start of a pitch, and a frame representing the end of a pitch.

An example in which a frame representing the start of a pitch, and a frame representing the end of a pitch have been detected, is schematically illustrated in FIG. 12. In the example of FIG. 12, the frame 86 is detected as a frame representing the start of a pitch, and the frame 88 is detected as a frame representing the end of a pitch. Namely, in the example of FIG. 12, from the frame 86 to the frame 88 is one pitch worth of footage. In the example of FIG. 12, the frame 92 is detected as a frame representing the start of the next pitch. From the frame 90 to the frame before the frame 92 is a cut other than the specific cut, for example, captured footage of a scene other than a pitcher's pitching scene, such as a batter, or the bench.

Next, at step S26, the generation section 24 generates metadata that associates data representing the starts of the pitches to time data associated to the frames representing the start of a pitch as detected by the detection section 22. Similarly, the generation section 24 generates metadata that associates data representing the ends of the pitches to time data associated to the frames representing the end of a pitch as detected by the detection section 22.

Next, at step S28, the generation section 24 generates the metadata file that stores the plural metadata generated at step S26 above in the sequence of the time data included in the metadata. Then, the generated metadata file is appended to the edited footage, and transmitted to the distribution device 30 as the metadata appended footage by the generation section 24, and the baseball footage metadata generation processing ends.

Figure 11:
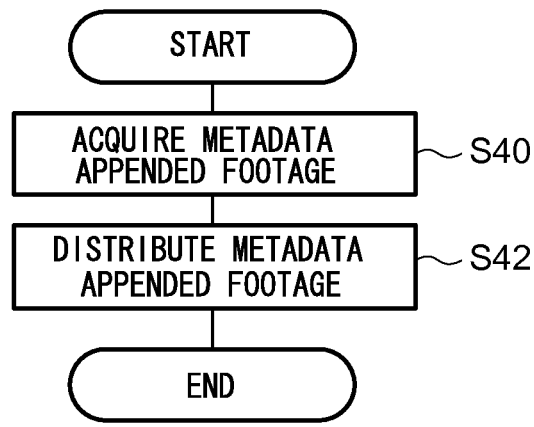
FIG. 11 is a flowchart illustrating an example of a distribution processing.

Next, at step S40 of the distribution processing illustrated in FIG. 11, the distribution section 34 acquires the metadata appended footage transmitted from the baseball footage metadata generation device 20. Next, at step S42, the metadata appended footage is converted to distribution footage according to the specified standards, and distributed to the distribution destination terminal (omitted from illustration in the drawings) by the distribution section 34, and distribution processing ends.

As explained above, according to the baseball footage metadata generation device 20 according to the first exemplary embodiment, from captured footage of a baseball game, frames are detected representing specific the cut captured in the batter-direction from behind the pitcher. Then, frames in which transition was made from a frame other than the frames representing specific cuts, to a frame representing a specific cut are extracted. Then, metadata that associates data representing the starts of the pitches to time data associated to the extracted frames is generated. Accordingly, automatic generation is enabled of metadata that enables playback of captured baseball game footage from each pitch delivered by a pitcher, from captured footage of a baseball game.

The metadata appended footage according to the technology disclosed herein, enables playback in pitch units in baseball game footage (the captured footage, or the edited footage), based on the metadata, enabling, for example, simple specification and viewing of footage during a pitcher's pitch, replays, or the like.

Second Exemplary Embodiment

Next, explanation follows with regards to a second exemplary embodiment. Note that the same reference numerals are appended for parts similar to those of the footage distribution system 10 according to the first exemplary embodiment, and detailed explanation thereof is omitted.

As illustrated in FIG. 1, a footage distribution system 210 according to the second exemplary embodiment includes a baseball footage metadata generation device 220, and a distribution device 30. The baseball footage metadata generation device 220 includes a detection section 222, and a generation section 24.

Figure 13:
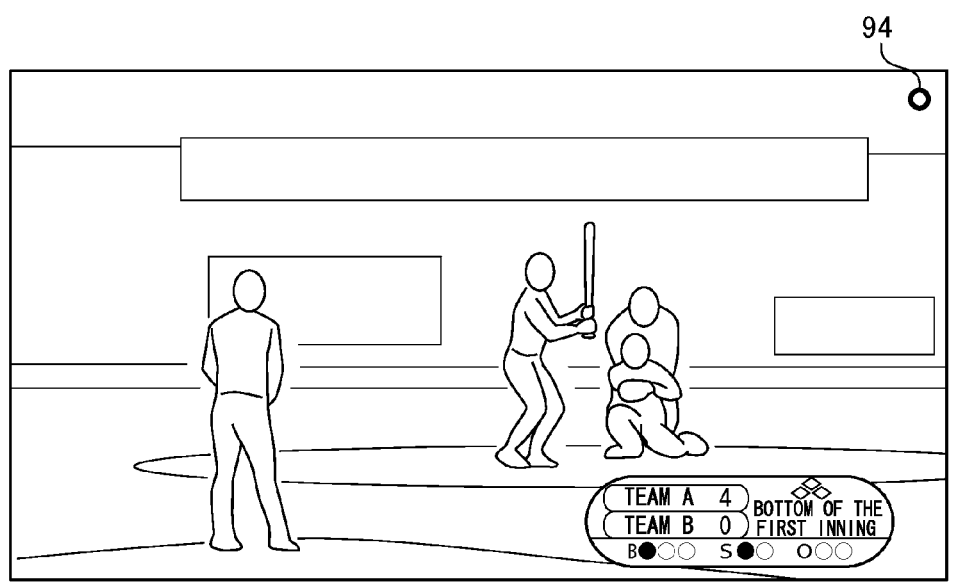
FIG. 13 is a diagram illustrating an example of identification data added to edited footage.

The detection section 222 acquires edited footage transmitted from the distribution device 30. In this edited footage, in contrast to in the first exemplary embodiment, identification data that identifies the specific cut is pre-added to frames representing the specific cut. The identification data is added to the edited footage as, for example, a mark 94 like that illustrated in FIG. 13.

The identification data may be added during capture of the captured footage, or may be added during editing of the captured footage. For example, a switch may be provided to a camera capturing in the batter-direction from behind the pitcher, and configuration made such that the identification data is added to the captured footage captured by the camera while the switch is pressed. Moreover, configuration may be made such that identification data is always added to any captured footage captured by a camera capturing in the batter-direction from behind the pitcher. The mark 94 that is identification data may be added during editing to add an overlay or the like to captured footage.

The detection section 222 identifies whether or not identification data is added for each frame of edited footage. For example, the detection section 222 may identify whether or not identification data is added by performing pattern matching, using a pattern representing the identification data, in a predetermined region of each frame. The detection section 222 extracts as frames representing the specific cut, frames to which identification data is identified to have been added.

The operation of the footage distribution system 210 according to the second exemplary embodiment differs only in the method of extracting the frames representing the specific cut at step S22 of the baseball footage metadata generation processing of the first exemplary embodiment illustrated in FIG. 10, and explanation thereof is therefore omitted.

As explained above, according to the baseball footage metadata generation device 220 according to the second exemplary embodiment, when footage is acquirable to which identification data has been added to the frames representing the specific cut, advantageous effects similar to those of the first exemplary embodiment are obtainable by simple processing.

In cases in which the identification data is added during capturing or editing as described above, sometimes the identification data is not added in the exact place where transition is made between a frame other than the frames representing specific cuts, and a frame representing a specific cut. In such cases, the detection section 222 may detect as the frame representing the start or end of a pitch, frames several frames before, or after the frames representing the specific cut extracted based on the identification data. In the first exemplary embodiment also, a frame several frames before, or after the extracted frames representing the specific cut may be detected as a frame representing the start, or end of a pitch.

The frames to which the identification data is added may be from one frame to several frames in segments at the start of the specific cut. In such cases, since frames representing the ends of pitches is not be detected based on the identification data, frames a specified amount of frames prior to the frame representing the start of the next pitch may be detected as frames representing the end of a pitch.

Third Exemplary Embodiment

Next, explanation is given regarding a third exemplary embodiment. Note that the same reference numerals are appended for parts similar to those of the footage distribution system 10 according to the first exemplary embodiment, and detailed explanation thereof is omitted.

As illustrated in FIG. 1, a footage distribution system 310 according to the third exemplary embodiment includes a baseball footage metadata generation device 320, and a distribution device 30. The baseball footage metadata generation device 320 includes a detection section 322, and a generation section 324.

Similarly to the detection section 22 of the first exemplary embodiment, the detection section 322 extracts the frames representing the specific cut. Then, the detection section 322 detects frames representing the start of a pitch, and frames representing the end of a pitch, based on a place at which transition is made between a frame representing a specific cut, and a frame other than the frames representing specific cuts.

Figure 14:
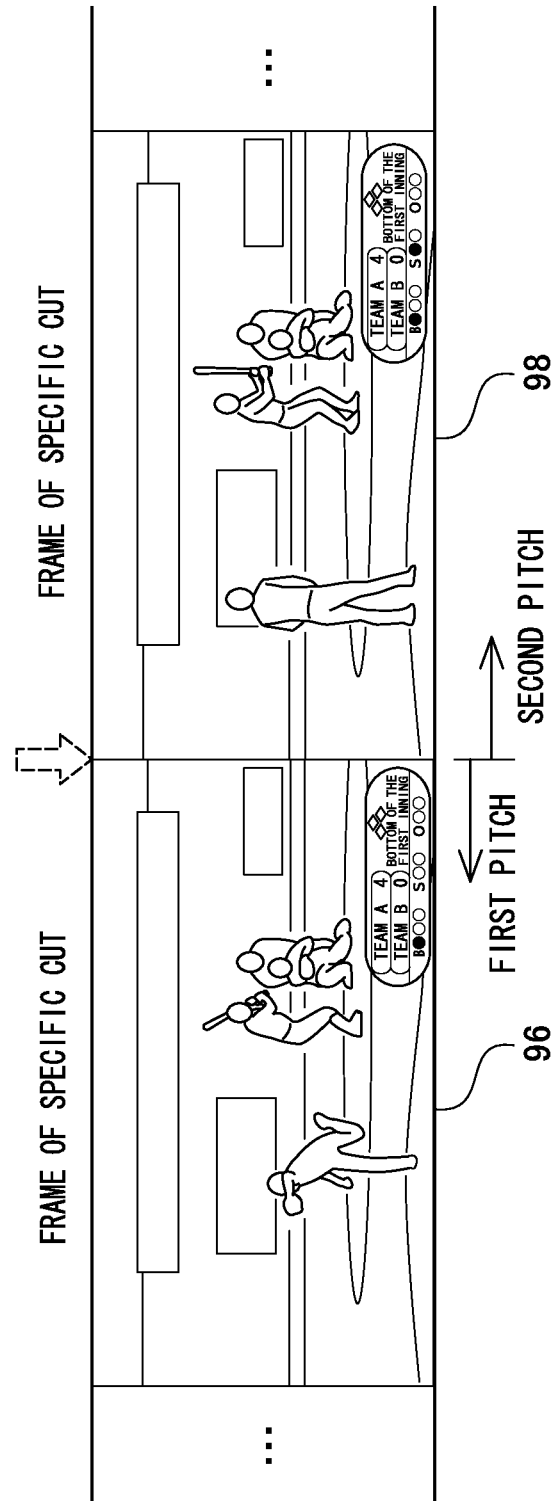
FIG. 14 is a diagram explaining a case in which plural pitching scenes are included in the same specific cut.

It is conceivable that plural pitching scenes may be included in a single specific cut in the captured footage. For example, as illustrated in FIG. 14, a frame 96 is considered the end of footage of the first pitch, and a following frame 98 onward is considered footage of the second pitch. Since the frame 96 and the frame 98 are both frames representing a specific cut, footage between the two frames, of cuts different from the specific cut between the beginning and end of a pitch, are not included. A situation like that illustrated in FIG. 14 may arise of a case in which, for example, plural pitches delivered by a pitcher (for example, two pitches) are captured in the captured footage, without footage including any footage captured by cameras other than the camera capturing the specific cut.

Figure 15:
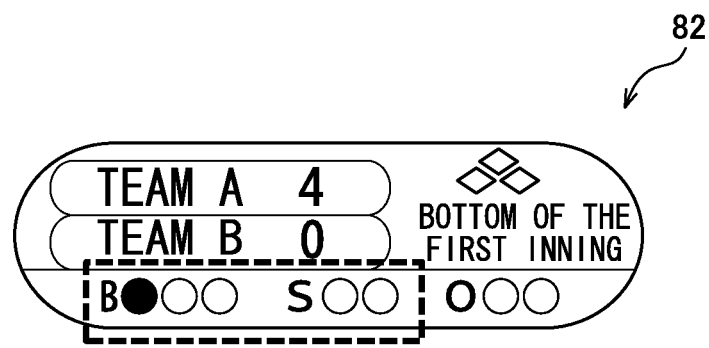
FIG. 15 is a diagram illustrating an example of an overlay indicating the game status.

In such cases, the detection section 322 may also extract a ball count display, indicating the ball count, from the overlay 82 indicating the game status, included in each of the frames representing the specific cut. The ball count is the result of determination as to whether a pitcher's pitches are balls or strikes. Specifically, the detection section 322, as illustrated in FIG. 15 for example, extracts a ball count display 100 from the overlay 82 indicating the game status, added to the frames representing the specific cut. The extraction of the ball count display 100 may for example, be extraction of a region predetermined as a region displaying the overlay 82 indicating the game status within a frame, or extraction using pattern matching. Moreover, the ball count display may be extracted using character recognition processing. As the ball count display in the example of FIG. 14, "B●∘∘ S∘∘" (1 ball, 0 strikes) is extracted from the frame 96, and "B●∘∘ S●∘" (1 ball, 1 strike) is extracted from the frame 98.

The detection section 322 detects a frame in which the ball count display has changed between consecutive frames representing the specific cut as a frame corresponding to the start of a pitch. Changes to the ball count display indicate that a pitch has been thrown by the pitcher, and the pitch has been determined to be a ball or a strike. Namely, a pitch can be determined to have been thrown at a timing of a specific amount of frames before the frame in which the ball count display has changed. In the example of FIG. 14, the ball count display changes between the frame 96 and the frame 98. Accordingly, the detection section 322 detects the frame 98 as a frame corresponding to the start of a pitch.

Similarly to the generation section 24 of the first exemplary embodiment, based on the frames representing the start of pitches and the frames representing the end of pitches detected by the detection section 322, the generation section 324 generates metadata indicating the starts of the pitches, and metadata indicating the ends of the pitches.

The generation section 324 may consider as frames indicating the start of a pitch, frames a specified amount of frames before or after frames corresponding to the starts of pitches detected based on changes to the ball count display by the detection section 322. The specified amount of frames before or after, may be a predetermined number of frames corresponding to a period of from the start of a pitch until the ball count display changes, or a period of from after the ball count display changes until a pitcher begins the next pitch, based on past game footage, or the like.

Next, explanation will be given regarding the operation of the footage distribution system 310 according to the third exemplary embodiment. Note that only the baseball footage metadata generation processing is different from the footage distribution system 10 according to the first exemplary embodiment. Explanation is given below, with reference to FIG. 16, regarding baseball footage metadata generation processing in the third exemplary embodiment. Note that the same reference numerals are appended for processing similar to the baseball footage metadata generation processing according to the first exemplary embodiment, and detailed explanation thereof is omitted.

At steps S20 to S26, based on a place where transition is made between a frame representing a specific cut and a frame other than the frames representing specific cuts, the detection section 322, and the generation section 324 detect frames that represent the start of a pitch, and frames that represent the end of a pitch. Then, metadata is generated based on the detected frames.

Next, at step S40, the ball count display indicating the ball count is extracted from the overlay 82, indicating the game status, included in each of the frames representing the specific cut. Then, the detection section 322 detects as frames corresponding to the start of a pitch, frames in which the ball count display has changed between consecutive frames representing a specific cut.

Next, at step S42, the generation section 324 generates metadata designating as frames representing the start of a pitch, frames a specified amount of frames before frames corresponding to starts of pitches detected by the detection section 322 based on changes to the ball count display.

Next, at step S28, the generation section 324 generates a metadata file including the metadata generated at step S42 above.

As explained above, according to the baseball footage metadata generation device 320 according to the third exemplary embodiment, frames corresponding to frames in which the ball count display has changed may also be determined to be frames representing the start of a pitch. Accordingly, generation of metadata indicating the start of each pitch is enabled, even when plural pitching scenes are included in the same specific cut.

In the third exemplary embodiment, explanation has been given regarding a case in which processing is executed that generates metadata indicating the starts of the pitches based on changes to the ball count display, in addition to the processing of the first exemplary embodiment; however, the processing of the third exemplary embodiment may be executed in addition to the processing of the second exemplary embodiment.

Fourth Exemplary Embodiment

Next, explanation is given regarding a fourth exemplary embodiment. Note that the same reference numerals are appended for parts similar to those of the footage distribution system 10 according to the first exemplary embodiment, and detailed explanation thereof is omitted.

As illustrated in FIG. 1, a footage distribution system 410 according to the fourth exemplary embodiment includes a baseball footage metadata generation device 420, and a distribution device 30. The baseball footage metadata generation device 420 includes a detection section 422, and a generation section 424. In the fourth exemplary embodiment, explanation is given regarding a case in which metadata is generated, indicating the starts of pitches of plural respective pitching scenes included in the same specific cut, using a different method from the third exemplary embodiment.

Similarly to the determination section 22 of the first exemplary embodiment, the detection section 422 extracts frames representing the specific cut. Then, frames representing the start of a pitch, and frames representing the end of a pitch are detected based on a place where a transition is made between a frame representing a specific cut, and a frame other than the frames representing specific cuts.

Figure 17:
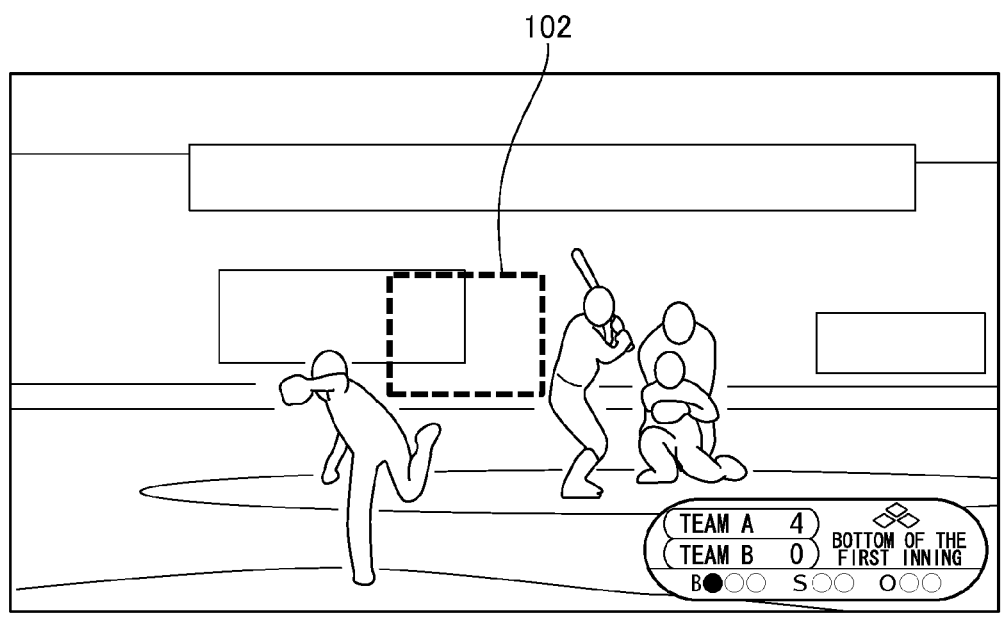
FIG. 17 is a diagram explaining a specified region for detecting a trajectory of a ball.
Figure 18:
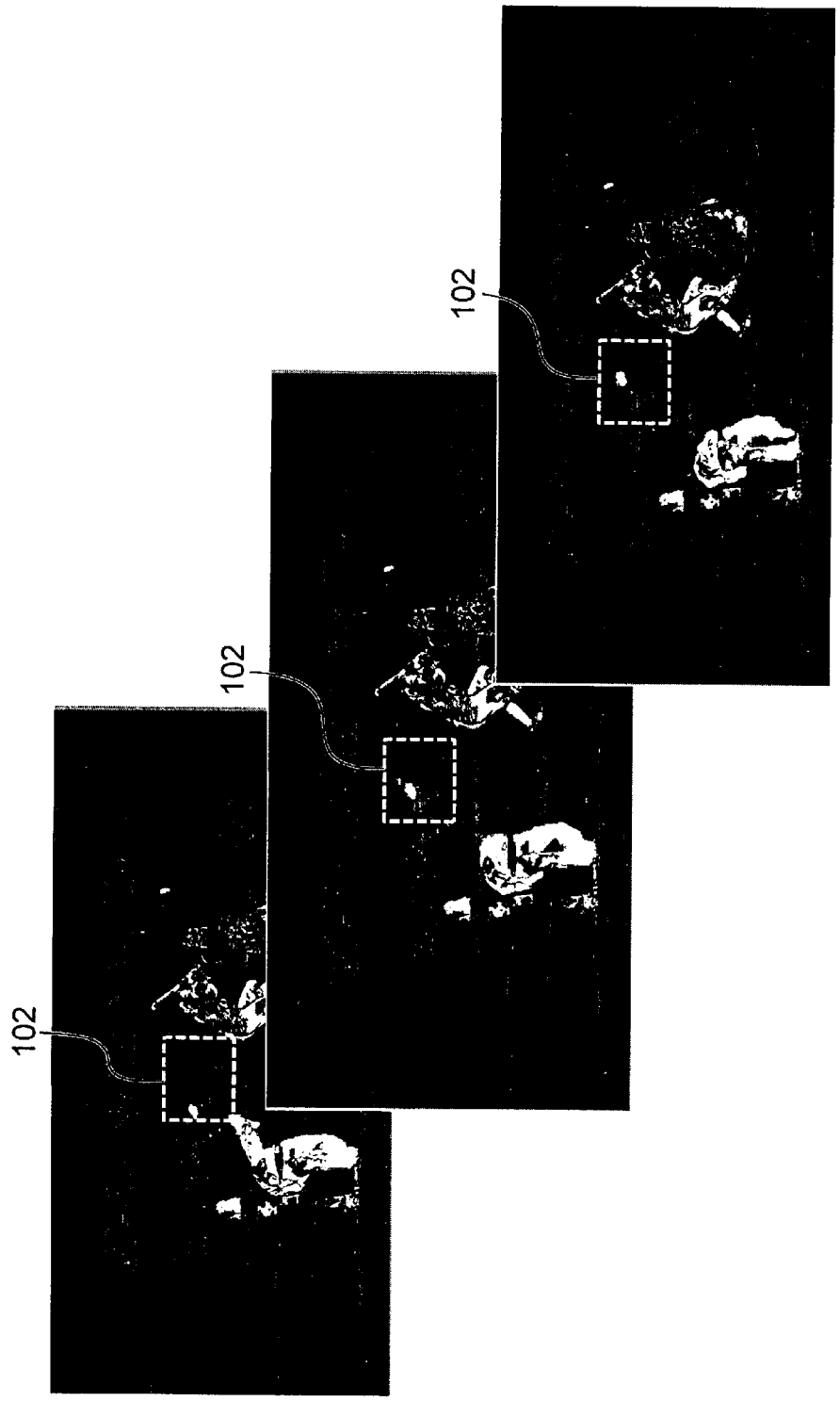
FIG. 18 is diagram illustrating an example of difference image.

The detection section 422 also detects as a frame corresponding to the start of a pitch, frames in which a ball trajectory that indicates a pitch in a specified direction by a pitcher appears in a specified region of frames representing plural consecutive specific cuts during consecutive frames representing specific cuts. As illustrated in FIG. 17 for example, a specified region 102 may be set between the pitcher and the batter. Specifically, the detection section 422 produces a difference image representing differences between corresponding pixels between the frames representing the consecutive specific cuts. An example of the difference image is illustrated in FIG. 18. In FIG. 18, the further forward the difference image, the more recent the time data of the source frame. Moreover, in FIG. 18, difference images of the whole of the frames are illustrated; however, a difference image may be produced of the specified region 102 alone.

Figure 19:
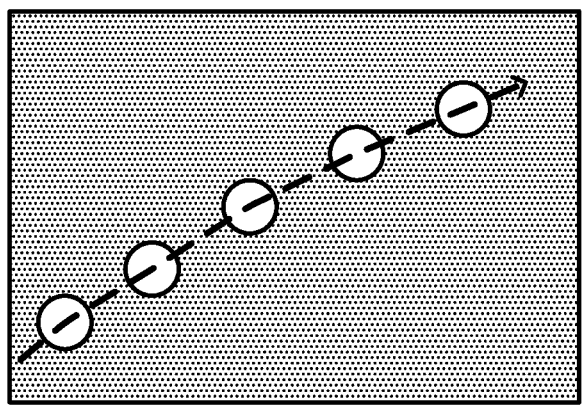
FIG. 19 is a diagram explaining detection of a trajectory of a ball.

When a ball trajectory appears by, for example overlaying plural consecutive difference images, the first detection section 22 determines whether or not the direction of the trajectory is in the specified direction. An example in which 5 difference images are overlaid is illustrated in FIG. 19. Each of the white circles in FIG. 19 is a difference region corresponding to the ball that appears in each difference image, illustrating an example in which the ball trajectory illustrated by the dashed arrow appears due to overlaying the difference images.

Figure 20:
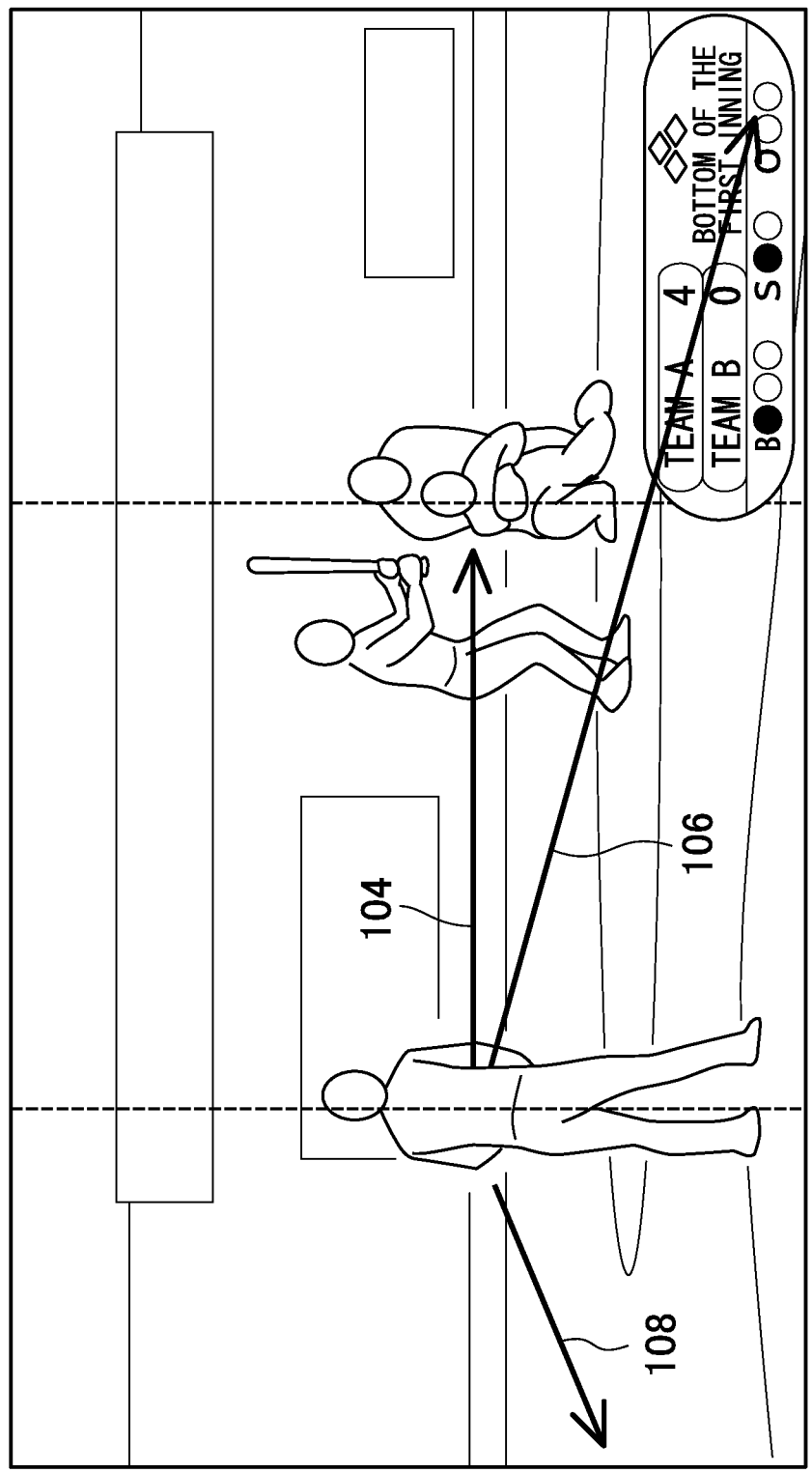
FIG. 20 is a diagram explaining the direction of a trajectory of a ball.

The specified direction is, for example, a direction in the edited footage (or this may be the captured footage) in which the thrown ball travels during a pitcher's pitch. The specified direction may be predetermined, or a position in a captured image of a person such as a batter, catcher, or an umpire may be specified, and the specific direction determined based on the position of the specified person. Although the specified direction is a direction indicating the ball trajectory, a direction enabling distinction between pitches toward the batter, and pickoffs, may also be predetermined. For example, as illustrated in FIG. 20, in a frame representing a specific cut, an arrow 104 indicates a pitch direction toward the batter, and an arrow 106, and an arrow 108 indicate directions of pickoffs. Accordingly, the direction of an arrow 104 may be determined as the specified direction in the example of FIG. 20. The region in which the ball trajectory is detected may also be set as a region able to detect pickoffs, such that whether the detected ball trajectory is a trajectory indicating a pitch toward the batter, or a trajectory indicating a pickoff (a trajectory in the direction of the arrow 106, or the arrow 108 in FIG. 20), are determined in combination. Pitches to the batter are thereby distinguishable from pickoffs in the edited footage (or may be in the captured footage).

Similarly to the generation section 24 of the first exemplary embodiment, the generation section 424 generates metadata indicating the starts of the pitches, and metadata indicating the ends of the pitches, based on the frames representing the start of a pitch, and the frames representing the end of a pitch detected by the determination section 322.

The generation section 424 also generates metadata that designates as frames corresponding to the start of a pitch, frames a specified amount of frames before frames corresponding to the start of a pitch, detected based on the ball trajectory by the detection section 422. The specified amount of frames before may be may be a predetermined number of frames corresponding to a period from the start of a pitch, until the actual pitch has been delivered, based on past game footage.

Figure 16:
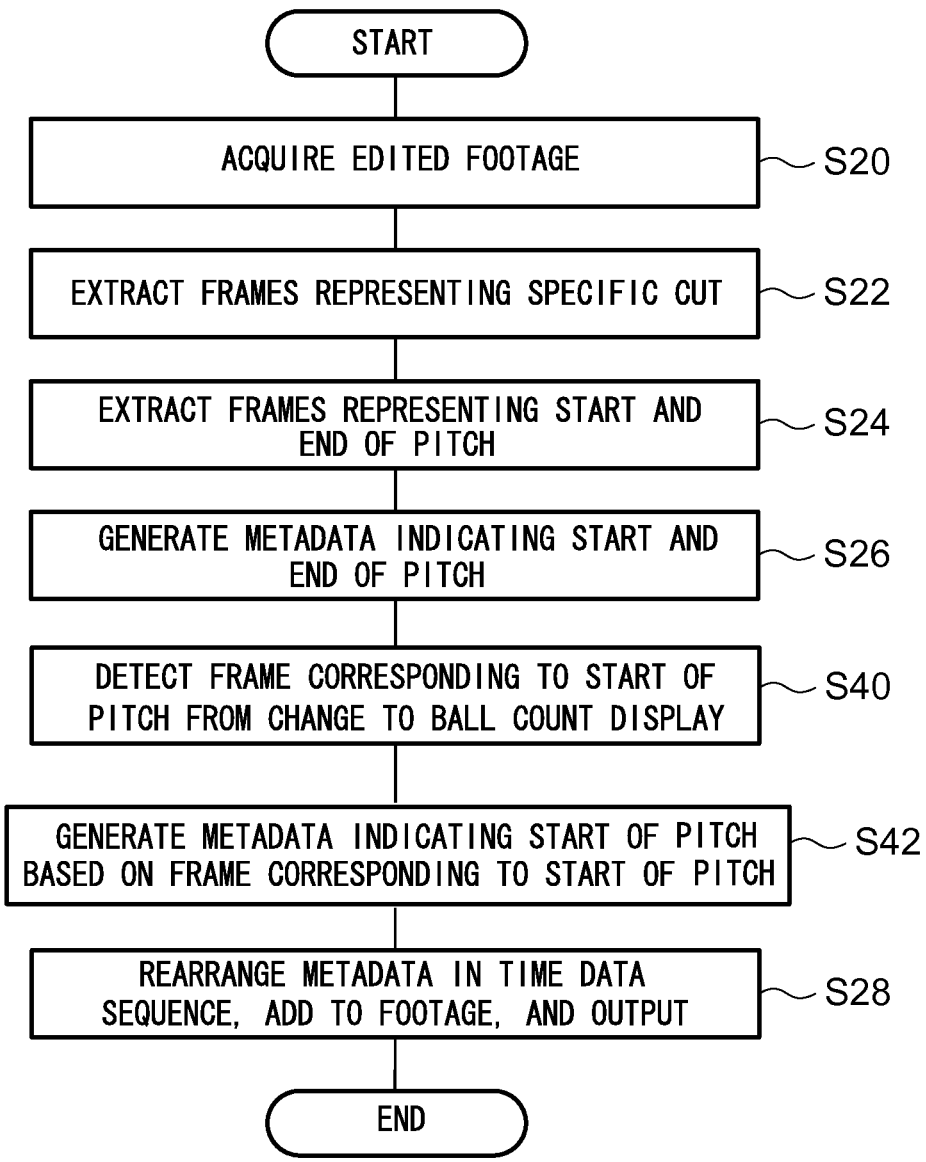
FIG. 16 is a flowchart illustrating an example of baseball footage metadata generation processing in the third exemplary embodiment.

The operation of the footage distribution system 410 according to the fourth exemplary embodiment, differs only in the detection method of frames corresponding to the start of a pitch at step S40 of the baseball footage metadata generation processing of the third exemplary embodiment illustrated in FIG. 16, and explanation thereof is therefore omitted.

As explained above, according to the baseball footage metadata generation device 420 according to the fourth exemplary embodiment, a frame corresponding to a frame in which a ball trajectory appears indicating a pitch by a pitcher in a specified direction, is also determined to be a frame representing the start of a pitch. Accordingly, even when plural pitching scenes are included in the same specific cut, extraction of the start of each pitch, and generation of metadata indicating the starts of the pitches are enabled.

In the fourth exemplary embodiment, explanation is given regarding a case in which processing is executed to generate metadata that indicates the starts of pitches based on the ball trajectory, in addition to the processing of the first exemplary embodiment; however, the processing may be executed in addition to the processing of the second exemplary embodiment.

The processing of the fourth exemplary embodiment may also be executed in addition to generating metadata that indicates the starts of pitches based on changes to a ball count display as explained for the third exemplary embodiment. For example, sometimes the ball count display does not change even though a pitch was thrown, such as when the batter bats a foul after two strikes. In the third exemplary embodiment, cases are conceivable in which the start of a pitch is not detected; however, such detection is enabled in the fourth exemplary embodiment.

Although explanation has been given in each exemplary embodiment described above in which a cut captured in the batter-direction from behind the pitcher is considered to be the specific cut, the specific cut is not limited thereto. For example, it is sufficient that the specific cut is a cut captured at a characteristic camera angle employed in pitchers' pitching scenes, such as a cut captured from a camera mounted to the head of the umpire (a cut captured from the umpire in the pitcher-direction).

Although explanation has been given in each exemplary embodiment described above, in which frames representing the start of a pitch and frames representing the end of a pitch are respectively detected based on the specific cut, there is no limitation thereto. For example, detection of frames representing the end of a pitch may be omitted. In such cases, although the metadata indicating the ends of the pitches is not generated, playback of footage from each pitch is possible based on metadata indicating the starts of the pitches. Moreover, a frame representing the end of a pitch may be detected as the frame a specified amount of frames before the frame representing the start of the next pitch.

Although explanation given in each exemplary embodiment described above considers a case in which the entire captured footage is input to the baseball footage metadata generation device after the game has finished, and metadata files are generated for the entire captured footage, there is not limitation thereto. For example, footage input to the baseball footage metadata generation device may be split into footage files in units of several seconds (such as 1 second, 3 seconds, or 5 seconds, for example). Then, the baseball footage metadata generation device may execute baseball footage metadata generation processing for each of the footage files of units of several seconds, and generate metadata for each of the footage files.

Since places representing the start of a pitch appear frequently at short time intervals during a baseball game, manually cutting out footage for each pitch in real-time is difficult. However, in the technology disclosed herein, substantially real-time generation of metadata indicating the starts of pitches is enabled. Accordingly, by inputting footage files of in units of several seconds, like those described above, the technology disclosed herein enables distribution delays due to labor to cut out footage, and the like, to be suppressed, even when applied to a live distribution.

When replays, and digests are included in the footage input to the baseball footage metadata generation device, frames representing the start of a pitch may be detected from a portion from which these are excluded. For example, replays are playback of footage of the previous play, or previous bat, during a comparatively short period in an inning, and digest footage is playback of footage such as a review of the game status up until that point, during a comparatively long period such as between innings Exclusion of footage portions of replays and digests is enabled by, for example, recognition of overlays indicating that footage is a replay or a digest.

In the case of replay footage, sometimes footage captured from a different camera angle, or footage zoomed in on a given portion is played back. Since the replayed footage is not extracted as a specific cut in such cases, there is no effect on the detection of the frames representing the start of a pitch. Sometimes slow-motion footage is employed as replay footage. In consideration of such cases, frames of slow-motion footage may be excluded from the frames extracted as frames representing the specific cut. Exclusion of slow-motion footage is enabled by, for example, slow-motion determination such as determining whether or not the same frame is repeated a specified number of times.

Although explanation has been given in each exemplary embodiment described above of examples in which in the footage distribution system includes a distribution device, and a baseball footage metadata generation device, there is no limitation thereto. Each functional section of the distribution device, and each functional section of the baseball footage metadata generation device may be implemented by a single computer.

Output from the baseball footage metadata generation device may be used in applications other than a footage distribution system.

Although explanation has been given above of a mode in which the baseball footage metadata generation program 50 is pre-stored (installed) on the storage section 46, and the distribution program 70 is pre-stored (installed) on the storage section 66, provision may be made in a recorded format on a recording medium, such as a CD-ROM, a DVD-ROM, or the like.

One aspect exhibits an advantageous effect of enabling extraction of the start of a pitch by a pitcher from captured footage of a baseball game.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the technology disclosed herein have been described in detail, it should be understood that the various changes, substitutions, and alterations could be made hereto without departing from the spirit and scope of the invention.

What is claimed is:

1. A non-transitory recording medium storing an extraction program that causes a computer to execute a process, the process comprising:
   detecting a frame representing a specific cut taken by a camera angle used in a pitcher's pitching scene, as a frame corresponding to the pitching scene included in captured footage of a baseball game that includes a plurality of frames, based on a frame image characteristic;
   extracting a frame, at which a transition is made from other frames not detected as frames corresponding to the pitching scene to the detected pitching scene, as a frame representing a start of one pitch of respective pitches by the pitcher; and
   from consecutive frames representing the specific cut, extracting any one of the consecutive frames in which a ball trajectory appearing in a specified region indicates a pitch by the pitcher in a specified direction that is distinguishable as being a pitch toward a batter from among pitches toward a batter and pickoffs, as a frame representing a start of one pitch of respective pitches by the pitcher.

2. The non-transitory recording medium according to claim 1, wherein the process further comprises:
   detecting a frame at which a ball count display that is included in frames representing the specific cut changes between the consecutive frames representing the specific cut; and
   generating metadata that designates a frame, corresponding to the detected frame at which the ball count display changes, as a frame representing a start of one pitch of respective pitches by a pitcher.

3. The non-transitory recording medium according to claim 1, wherein the process further comprises:
   detecting a frame that includes identification data added during capture by a camera for capturing the pitching scene, as a frame corresponding to the pitching scene.

4. The non-transitory recording medium according to claim 1, wherein in the frame representing a specific cut, the frame image characteristic correspond to reference image characteristics adapted for a dominant hand of at least either one of the pitcher or the batter.

5. An extraction method, comprising:
   by at least one processor:
   detecting a frame representing a specific cut taken by a camera angle used in a pitcher's pitching scene, as a frame corresponding to the pitching scene included in captured footage of a baseball game that includes a plurality of frames, based on a frame image characteristic;

extracting a frame, at which a transition is made from other frames not detected as frames corresponding to the pitching scene to the detected pitching scene, as a frame representing a start of one pitch of respective pitches by the pitcher; and from consecutive frames representing the specific cut, extracting any one of the consecutive frames in which a ball trajectory appearing in a specified region indicates a pitch by the pitcher in a specified direction that is distinguishable as being a pitch toward a batter from among pitches toward a batter and pickoffs, as a frame representing a start of one pitch of respective pitches by the pitcher.

6. A baseball footage metadata generation device, comprising:

a memory storing instructions; and at least one processor that executes the instructions to cause the baseball footage metadata generation device to perform:

detecting, from each of a plurality of frames included in captured footage of a baseball game, a frame at which a transition is made from frames other than a frame representing a specific cut captured at a camera angle employed in a pitchers' pitching scene to a frame representing the specific cut;

generating metadata that designates the detected frame as a frame representing a start of one pitch of respective pitches by the pitcher;

from consecutive frames representing the specific cut, extracting any one of the consecutive frames in which a ball trajectory appearing in a specified region indicates a pitch by the pitcher in a specified direction that is distinguishable as being a pitch toward a batter from among pitches toward a batter and pickoffs, as a frame representing a start of one pitch of respective pitches by the pitcher; and generating metadata that designates a frame corresponding to the frame in which the ball trajectory appearing in the specified region indicates the pitch in the specified direction.

7. The baseball footage metadata generation device of claim 6, wherein the at least one processor executes the instructions to cause the baseball footage metadata generation device to further perform:

detecting a frame in which an image characteristic extracted therefrom is similar to a characteristic predetermined as a characteristic of frames representing the specific cut, as a frame representing the specific cut.

8. The baseball footage metadata generation device of claim 6, wherein the at least one processor executes the instructions to cause the baseball footage metadata generation device to further perform:

detecting a frame to which identification data that identifies the specific cut has been pre-added, as a frame representing the specific cut.

9. The baseball footage metadata generation device of claim 6, wherein the at least one processor executes the instructions to cause the baseball footage metadata generation device to further perform:

detecting a frame at which a ball count display that is included in frames representing the specific cut changes between the consecutive frames representing the specific cut; and generating metadata that designates a frame, corresponding to the detected frame at which the ball count display changes, as a frame representing a start of one pitch of respective pitches by a pitcher.

10. The baseball footage metadata generation device of claim 6, wherein the at least one processor executes the instructions to cause the baseball footage metadata generation device to further perform:

generating metadata that designates a frame in which transition was made from a frame representing the specific cut, to a frame other than frames representing the specific cut, as a frame representing the end of one pitch of respective pitches by the pitcher.

* * * * *